(12) United States Patent (10) Patent No.: US 7,403,380 B2
Kim (45) Date of Patent: Jul. 22, 2008

(54) COMPUTER CASE WITH OPTICAL DISK DRIVE MOUNTED ON CHASSIS FRONT

(75) Inventor: Mun Chul Kim, Seoul (KR)

(73) Assignee: G. M. Corporation, Ltd., Seoul (KR)

( * ) Notice: Subject to any disclaimer, the term of this patent is extended or adjusted under 35 U.S.C. 154(b) by 0 days.

(21) Appl. No.: 11/675,466

(22) Filed: Feb. 15, 2007

(65) Prior Publication Data

US 2008/0120629 A1 May 22, 2008

(30) Foreign Application Priority Data

Nov. 20, 2006 (KR) .................. 10-2006-0114349
Jan. 8, 2007 (KR) .................. 10-2007-0001895

(51) Int. Cl.
*G06F 1/16* (2006.01)
(52) U.S. Cl. .................. 361/685; 720/698; 345/156
(58) Field of Classification Search ........... 345/156, 345/158; 312/223.1–223.6; 360/137; 235/380, 235/440; 720/600, 728, 619; 361/679–587, 361/724–727
See application file for complete search history.

(56) References Cited

U.S. PATENT DOCUMENTS 5,572,402 A * 11/1996 Jeong .................. 361/685
5,940,354 A * 8/1999 Inoue .................. 369/30.43

* cited by examiner

*Primary Examiner*—Hung V Duong
(74) *Attorney, Agent, or Firm*—Sean Liam Kelleher; Lilling & Lilling PLLC (57) ABSTRACT

Disclosed herein is a newly-designed computer case with an optical disk drive mounted on a chassis front, in which an optical disk drive such as a compact disk player (CDP), a digital video disk player (DVDP) and the like is mounted on a chassis front the computer case so as to reduce the front and rear width of the computer case to a size corresponding to the front and rear length of the optical disk drive, to facilitate the use of the optical disk drive, and to improve the image of the product with a unique design.

5 Claims, 7 Drawing Sheets

COMPUTER CASE WITH OPTICAL DISK DRIVE MOUNTED ON CHASSIS FRONT

CROSS-REFERENCE TO RELATED APPLICATION

This application claims the benefit of Korean Patent Application Nos. 10-2006-0114349, filed on Nov. 20, 2006 and 10-2007-0001895, filed on Jan. 8, 2007, the entire disclosures of which are hereby incorporated by reference.

BACKGROUND OF THE INVENTION

1. Field of the Invention

The present invention relates to a computer case with an optical disk drive mounted on a chassis front and, more particularly, to a computer case in which an optical disk drive such as a compact disk player (CDP), a digital video disk player (DVDP) and the like is mounted on a chassis front that constitutes the computer case so as to reduce the front and rear width of the computer case by a size corresponding to the front and rear length of the optical disk drive, to facilitate the use of the optical disk drive, and to improve the image of the product with a unique design.

2. Description of Related Art

Recently, as computers have been mainly used in processing works at home or in office and the Internet network has been established throughout the world, information searches have been widely performed using such computers.

In proportion to the increase in the use of the computers, the information processing speed of computer has become much faster and its capacity has also become greater. Accordingly, the computer has been splendidly upgraded by loading various peripheral devices, such as a compact disk player (CDP), a digital video disk player (DVDP) and the like therein, so as to replay moving images and music files, other than a simple work process, such as data input and output, and an information search function.

Meanwhile, in a computer main body, various hardware such as a main PCB on which a CPU is loaded, a hard disk drive (HDD) and the like are protected by a separate case in which the bottom portion thereof is opened and a space portion shielded by left and right lateral plates, a front plate, a rear plate and a top plate is established.

However, since a conventional computer case in which the computer main body is placed has a structure in which the optical disk drives such as CDP, DVDP and the like are inserted and mounted from the front plate of the computer case to the inside of the space portion, the volume of the space portion in the computer case is decreased and thereby the whole volume of the computer case is unavoidably increased to ensure the volume of the space portion in the computer case.

Meanwhile, in the case where the volume of the computer case is increased, it causes problems in that it is very inconvenient to handle the computer and it occupies a large space to reduce the space utilization.

Moreover, in the case where the optical disk drive is inserted and mounted into the inside of the computer case, a disk tray on which a disk is placed protrudes forward in the initial stage of operation. Accordingly, the operation of loading the disk on the disk tray in a sitting posture is very inconvenient and, further, if the disk is not properly loaded on the disk tray, a malfunction occurs.

SUMMARY OF THE INVENTION

Accordingly, the present invention has been contrived to solve the above-described drawbacks, and an object of the present invention is to provide a computer case with an optical disk drive mounted on a chassis front, in which an optical disk drive such as a compact disk player (CDP), a digital video disk player (DVDP) and the like is mounted on a chassis front that constitutes the computer case so as to reduce the front and rear width of the computer case by a size corresponding to the front and rear length of the optical disk drive, to facilitate the use of the optical disk drive, and to improve the image of the product with a unique design.

To accomplish the above objects of the present invention, there is provided a computer case with an optical disk drive mounted on a chassis front comprising: a case main body, formed in a hexahedral shape having a volume that can sufficiently accommodate hardware constituting a computer, in which a bottom portion thereof is opened and a space portion shielded by left and right lateral plates, a front plate, a rear plate and a top plate is established therein; and a chassis front inserted and mounted into the outside of the front plate of the case main body, the computer case comprising: a receiving portion, on which an optical disk drive is inserted and placed, established in the form of a container, of which an inner side is opened and outer, left and right sides are closed, below the chassis front constituting the computer case; a tray moving groove, of which an outer side is opened, formed in the middle of the chassis front corresponding to an upper portion of the receiving portion to be connected with the receiving portion via a through-hole, through which a disk tray can be freely drawn in and out when driving the optical disk drive; and a fixing piece fixing the optical disk drive, established on both sides of the front plate of the case main body corresponding to the position where the receiving portion is formed.

In the present invention, a disk drive operation switch electrically coupled to the optical disk drive and controlling the operation of the optical disk drive is established on one side of the chassis front, a main switch electrically connected to a main PCB mounted inside the case main body and controlling the ON/OFF operation of the computer is provided in front of the chassis front corresponding to an upper portion of the tray moving groove, a function portion section including a plurality of function ports electrically coupled to the main PCB mounted inside case main body is established on a top surface of the chassis front, and the function port section is opened and closed by a cover.

BRIEF DESCRIPTION OF THE SEVERAL VIEWS OF THE DRAWINGS

The above and other features of the present invention will be described with reference to certain exemplary embodiments thereof illustrated the attached drawings in which.

DETAILED DESCRIPTION OF THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

Figure 1:
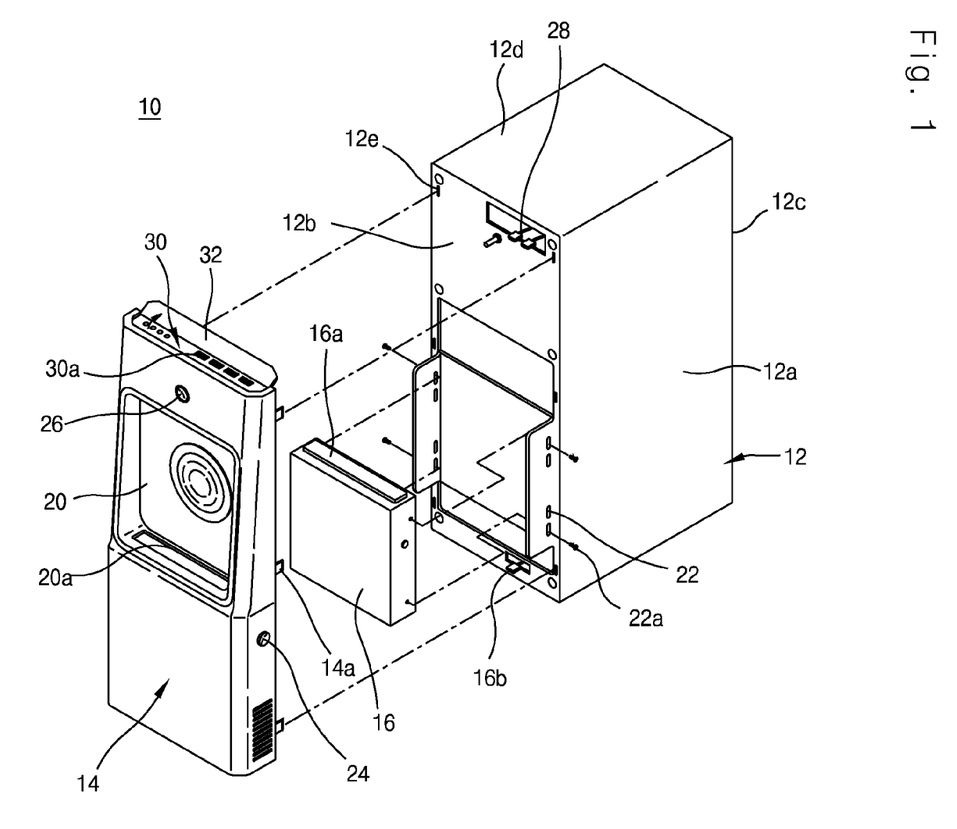
FIG. 1 a partially exploded perspective view depicting a computer case in which an optical disk drive is mounted on a chassis front in accordance with the present invention.
Figure 2:
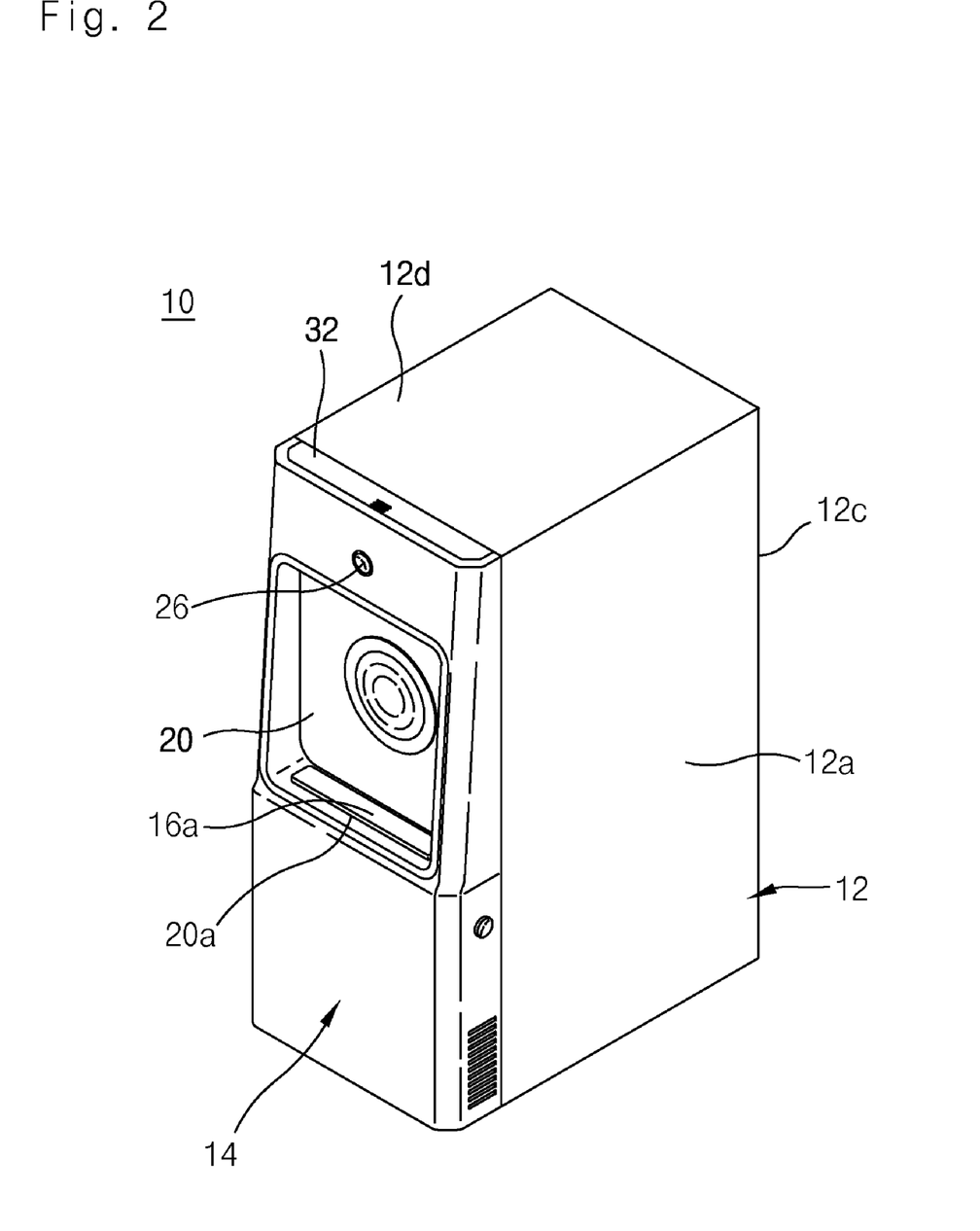
FIG. 2 is a perspective view depicting a connection state of FIG. 1.

FIG. 1 a partially exploded perspective view depicting a computer case in which an optical disk drive is mounted on a chassis front in accordance with the present invention, and FIG. 2 is a perspective view depicting a connection state of FIG. 1.

Figure 3:
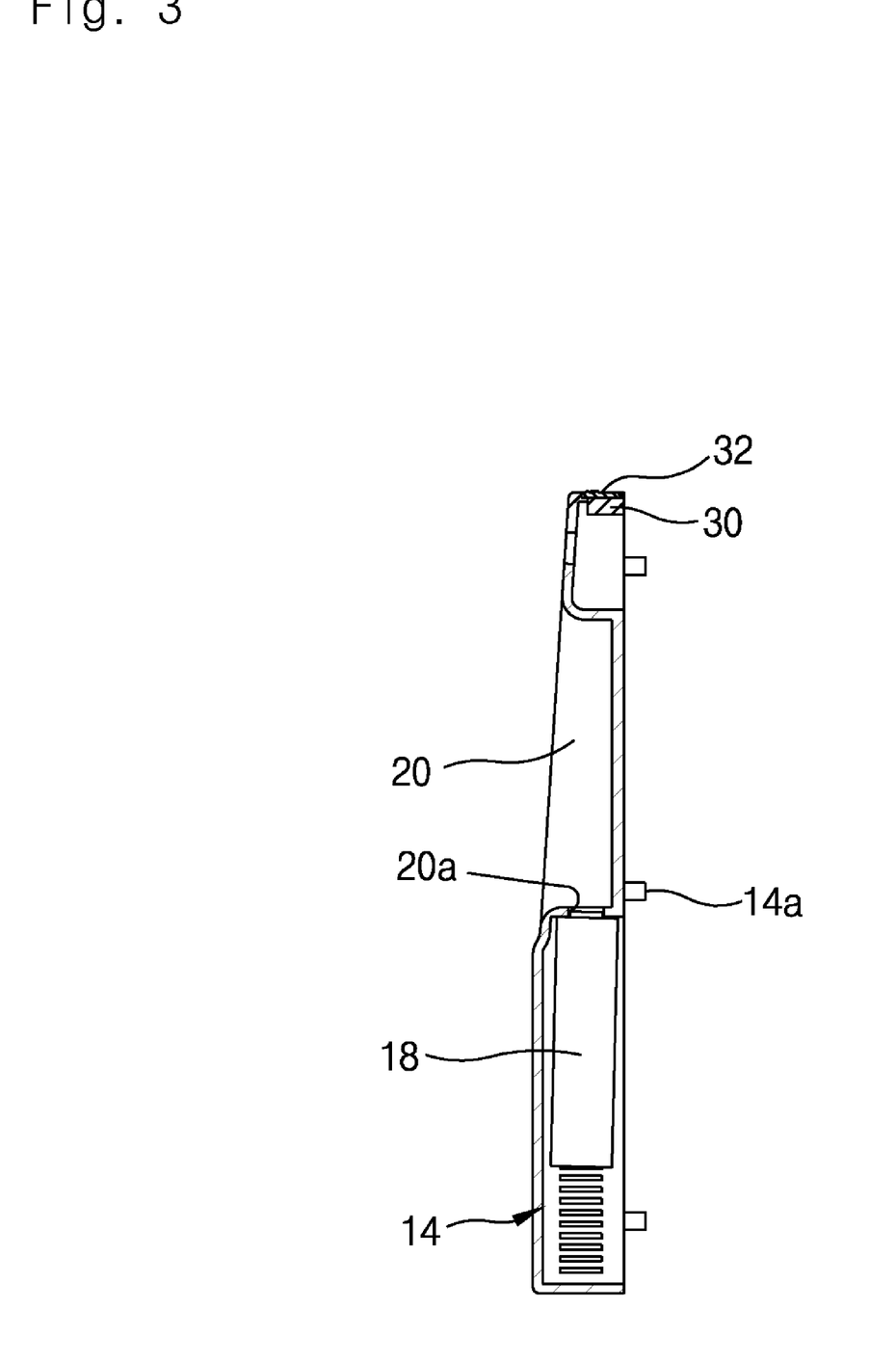
FIG. 3 is a side cross-sectional view of a chassis front that constitutes a computer case in accordance with the present invention.

FIG. 3 is a side cross-sectional view of a chassis front that constitutes a computer case in accordance with the present invention.

Figure 4:
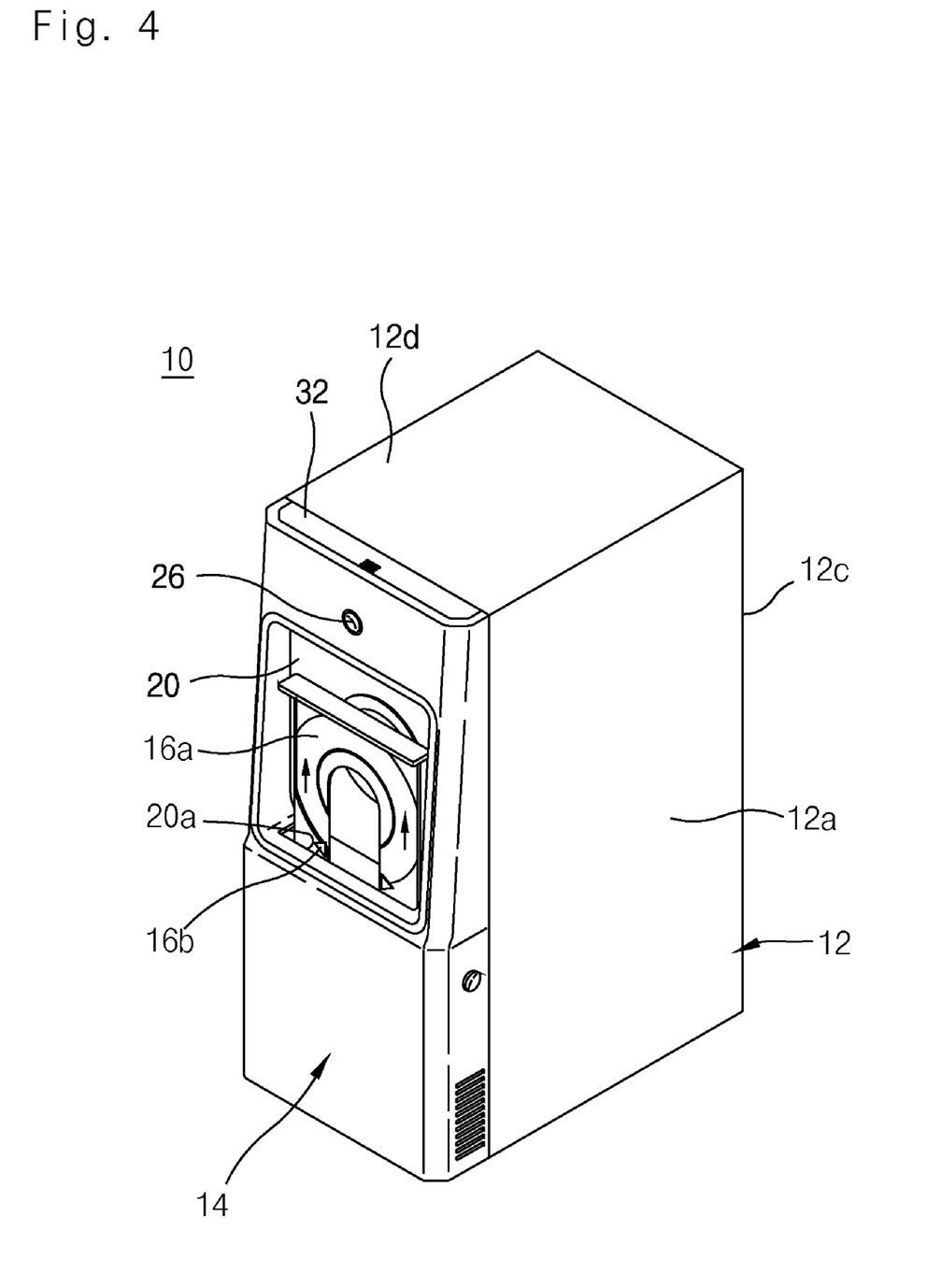
FIG. 4 is a perspective view depicting a state where a disk tray of an optical disk drive is drawn out in a tray moving groove in an initial stage of operation in a computer case in which an optical disk drive is mounted on a chassis front in accordance with the present invention.
Figure 5:
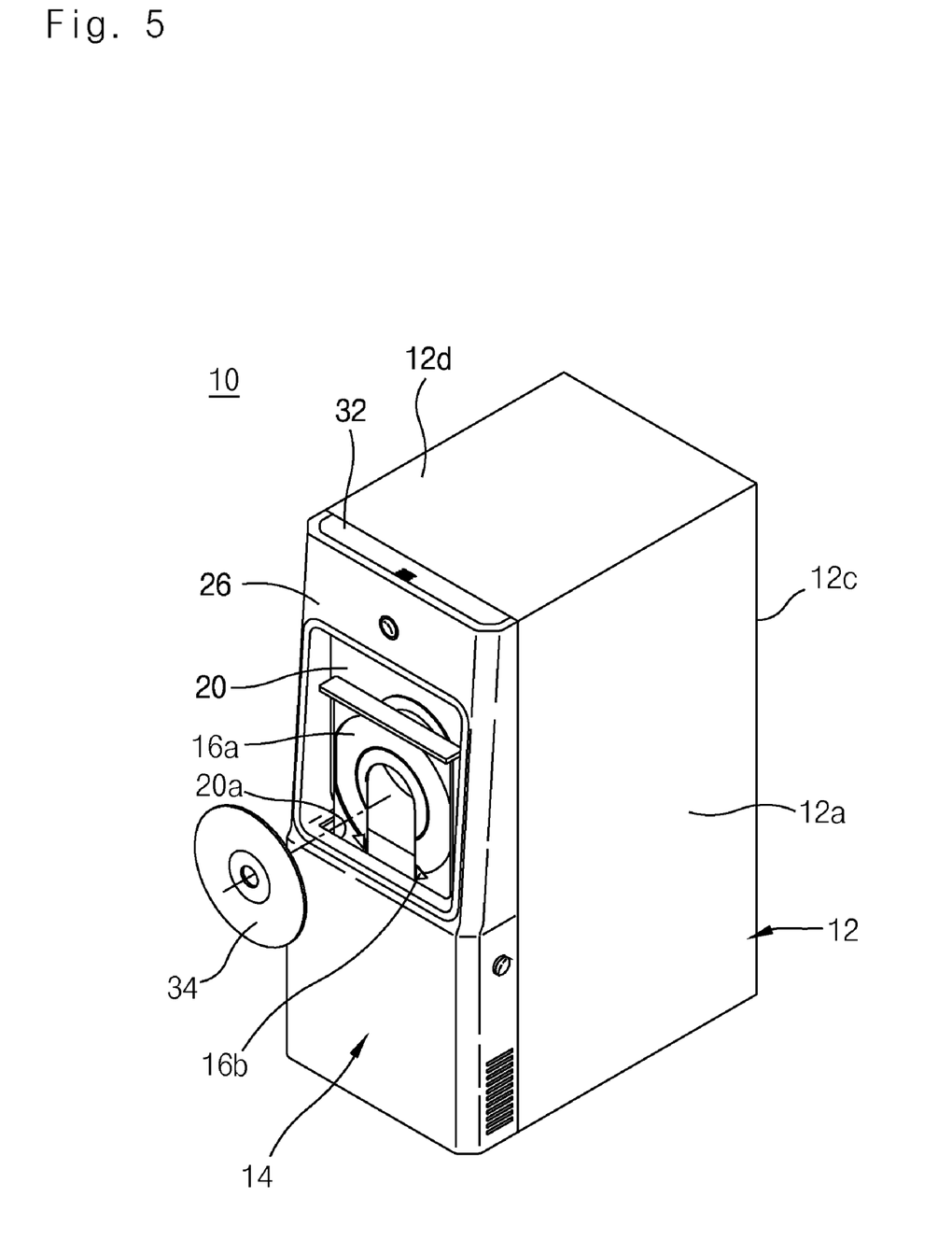
FIG. 5 is a perspective view depicting a state where a disk is loaded on the disk tray in FIG. 4.

Moreover, FIG. 4 is a perspective view depicting a state where a disk tray of an optical disk drive is drawn out in a tray moving groove in an initial stage of operation in a computer case in which the optical disk drive is mounted on the chassis front in accordance with the present invention, and FIG. 5 is a perspective view depicting a state where the disk is loaded on the disk tray in FIG. 4.

Figure 6:
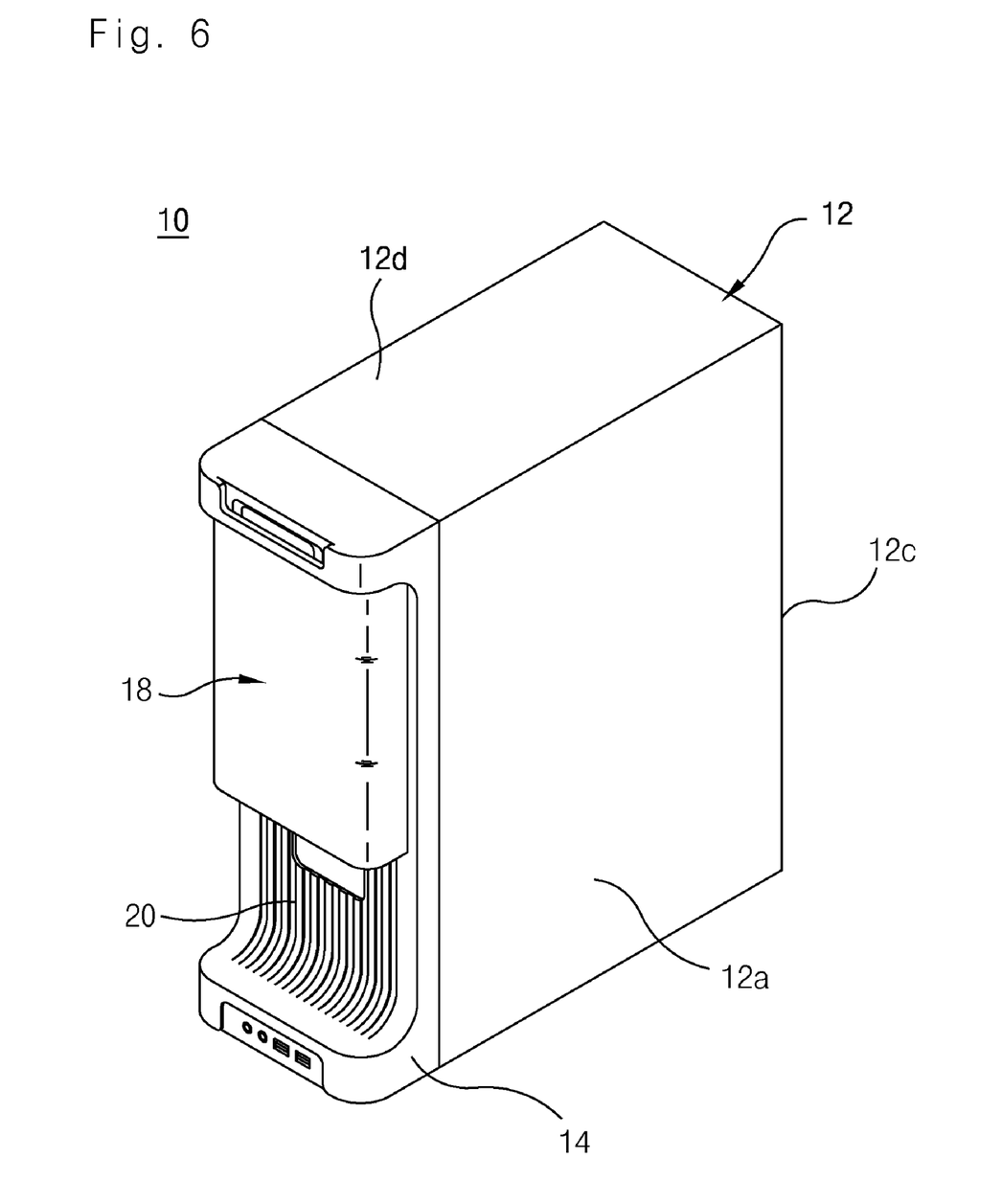
FIG. 6 is a perspective view depicting a computer case in which an optical disk drive receiving portion is established on the top of the chassis front as another example of the present invention.
Figure 7:
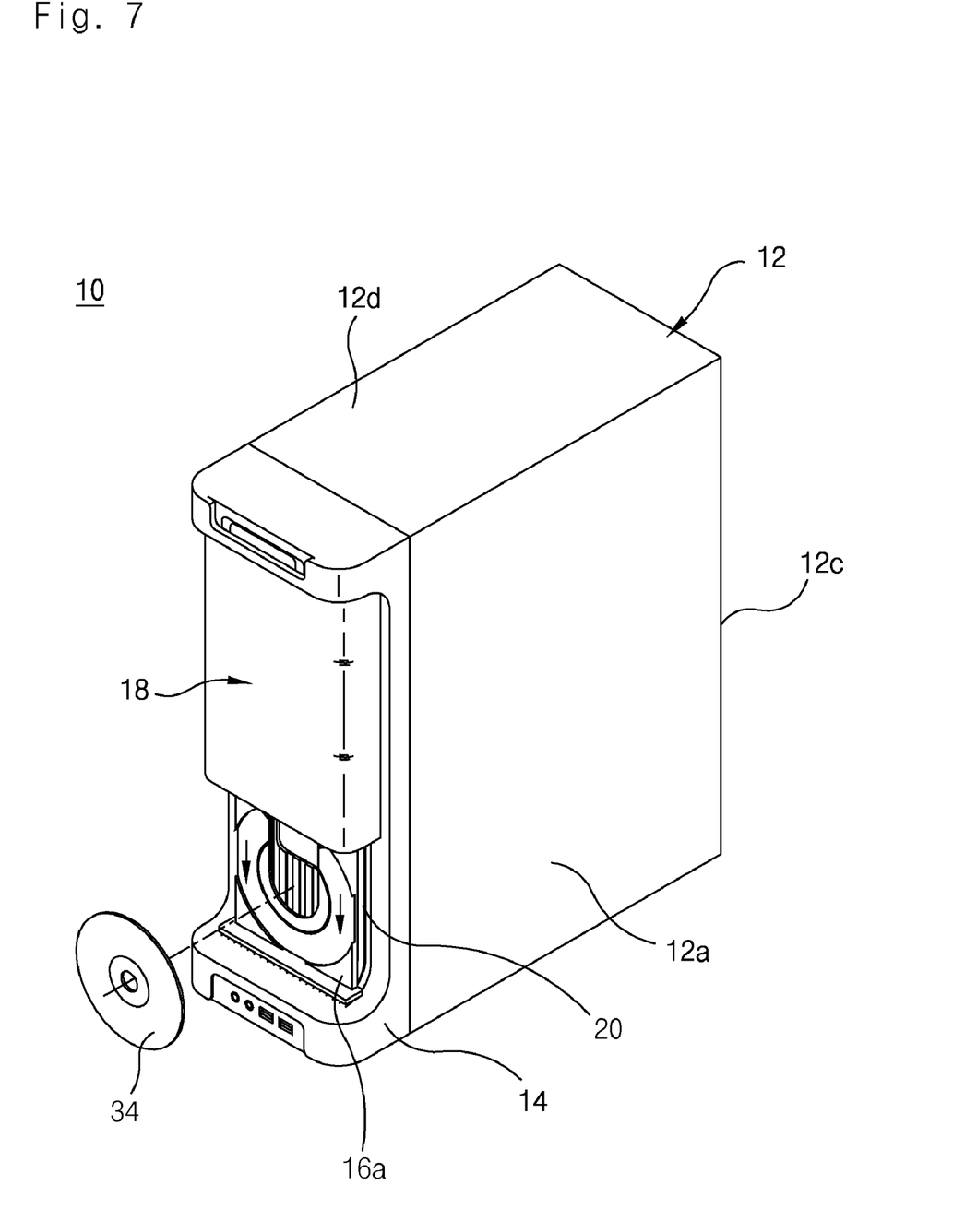
FIG. 7 is a perspective view depicting a state where a disk tray of an optical disk drive is drawn out in a tray moving groove in an initial stage of operation from the state of FIG. 6.

Furthermore, FIG. 6 is a perspective view depicting a computer case in which an optical disk drive receiving portion is established on the top of the chassis front as another example of the present invention, and FIG. 7 is a perspective view depicting a state where the disk tray of the optical disk drive is drawn out in the tray moving groove in the initial stage of operation from the state of FIG. 6.

Referring to those figures, the computer case 10 in which the optical disk drive is mounted on the chassis front in accordance with the present invention is designed so as to reduce the front and rear width of the computer case by a size corresponding to the front and rear length of the optical disk drive, to facilitate the use of the optical disk drive, and to improve the image of the product with a unique design.

To accomplish the above objects, the present invention provides a case main body 12, formed in a hexahedral shape having a volume that can sufficiently accommodate hardware constituting a computer, in which the bottom portion thereof is opened and a space portion shielded by left and right lateral plates 12a, a front plate 12b, a rear plate 12c and a top plate 12d is established. Moreover, a chassis front 14 separately provided is inserted and mounted into the outside of the front plate 12b of the case main body 12.

A receiving portion 18, on which an optical disk drive 16 is inserted and placed, is established in the form of a container, of which the inner side is opened and the outer, left and right sides are closed, below the chassis front 14 that constitutes the computer case 10.

Moreover, tray moving grooves 20, of which the outer side is opened, are formed in the middle of the chassis front 14 corresponding to the upper portion of the receiving portion 18 to be connected with the receiving portion 18 via a through-hole 20a. Through the tray moving grooves 20, the disk tray 16a can be freely drawn in and out when driving the optical disk drive 16.

A fixing piece 22 fixing the optical disk drive 16 is established on both sides of the front plate 12b of the case main body 12. The optical disk drive 16 is mounted vertically to the fixing pieces 22 fixing the optical disk drive 16 or the top end portion thereof is inclined in the slope of 3° to 5° based on the vertical line to the computer body.

In the present invention configured as described above, a disk drive operation switch 24 electrically connected to the operation of the optical disk drive 16 and controlling the same is established on one side of the chassis front 14. A main switch 26 electrically coupled to a main PCB mounted inside the case main body 12 is established in front of the chassis front 14 corresponding to the upper portion of the tray moving grooves 20 to control the ON/OFF operation of the computer.

Moreover, a function port section 30 including a plurality of function ports 30a electrically connected to the main PCB mounted inside the case main body 12 through a connector 28 separately provided is established on the top surface of the chassis front 14. The function port section 30 is opened and closed by a cover 32 separately provided.

In the present invention configured as described above, the optical disk drive 16 is electrically coupled to a power supply unit established inside the case main body 12. For this purpose, another connector 16b drawn out from the power supply unit is arranged to be exposed to the outside of the bottom of the front plate 12b constituting the case main body 12.

Furthermore, a plurality of hook pieces 14a are formed protruding from the edges of the inner surface of the chassis front 14 and a hook piece insertion hole 12e is established on the edges of the front plate 12b corresponding to the respective hook pieces 14a.

In the present invention, a disk separation preventing piece 16b may be adhered to both sides of the bottom surface of the disk tray 16a by adhesive tape so that the disk 34 placed on the disk tray 16a may not be separated forward.

The receiving portion 18 in the form of a container on which the optical disk drive 16 is inserted and placed in the present invention may be arranged on the top of the chassis front 14, and the tray moving grooves 20 may be established on the bottom of the front surface of the chassis front 15 corresponding to the bottom of the receiving portion 18 to allow the disk tray 16a to come in and out freely when driving the optical disk drive 16, as depicted in FIGS. 6 and 7.

The connection state and the operation of the present invention configured as described above will be described as follows.

Referring to FIGS. 1 to 7, first, the optical disk drive 16 positioned between the fixing pieces 22 on the front plate 12b constituting the case main body 12 is fixed thereto by connecting screws 22a and then the connector 16b drawn out to be exposed to the bottom of the front plate 12b is connected to the optical disk drive 16 to be electrically coupled.

In such a state, the respective hook pieces 14a formed on the edges of the inner surface of the chassis front 14 are inserted into the respective hook piece insertion holes 12e established on the edges of the front plate 12b, thus connecting the chassis front 14 to the front of the case main body 12.

Subsequently, the optical disk drive 16 fixed on the outer side of the bottom of the front plate 12b is inserted into the receiving portion 18 formed inside the bottom of the chassis front 14 and received therein.

Moreover, the respective function ports of the function port section 30 are electrically coupled to the main PCB mounted inside the case main body 12 through the connector 28, and the disk drive operation switch 24 and the main switch 26 are electrically coupled to the optical disk drive 16 and the main PCB through a separate wire, respectively.

Then, if the computer is turned 'ON' by operating the main switch 26 and if the disk drive operation switch 24 established on one side of the chassis front 14 is operated, the disk tray 16 is slidably moved from the inside of the optical disk drive 16 upward and drawn out in the tray moving grooves 20 via the through-hole 20a as depicted in FIG. 4.

Meanwhile, in the case where the receiving portion 18, on which the optical disk driver 16 is inserted and placed, is formed on the top of the chassis front 14, the moving operation of the disk tray 16 is made in the opposite direction.

Here, in the case where the optical disk drive 16 is mounted in the slop of 3° to 5° or where the disk separation preventing piece 16b is adhered to the bottom surface of the disk tray 16a, the disk 34 loaded on the disk tray 16a is not separated.

In this state, if a user loads the disk 34 on the disk tray 16a and operates the operation switch 26 again, the disk tray 16a on which the disk 34 is loaded is drawn into the optical disk drive 16 and then the disk 34 is rotated by the rotational operation of a turn table, not depicted, that constitutes the optical disk drive 16 so as to replay the information stored in the disk 34 or write information in the disk 34.

Meanwhile, in order to download music using MP3 or connect a digital camera to the computer, the user opens the cover 32 of the function port section 30 established on the top of the chassis front 14 and connects a jack drawn out from the MP2 or the digital camera to the corresponding function port 30a on the function port section 30.

According to the present invention as described in detail above, as the optical disk drive such as CDP, DVDP and the like that constitutes the computer case is established on the chassis front, the inside volume of the case main body constituting the computer case is reduced by the volume corresponding to the volume of the optical disk drive. Accordingly, it is possible to achieve the downsizing of the computer case and thereby increase the space utilization.

Moreover, as the disk tray of the optical disk drive established on the chassis front constituting the computer case is configured to be drawn upward in the vertical direction, the operation of loading the disk on the disk tray in the initial stage of operation is very convenient. Furthermore, as the disk can be loaded in an accurate position thereof, it is possible to prevent the malfunction of the optical disk drive.

In addition, as the optical disk drive is mounted on the chassis front constituting the computer case, it is possible to improve the image of the product with a unique design.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A computer case with an optical disk drive mounted on a chassis front comprising: a case main body, formed in a hexahedral shape having a volume that sufficiently accommodates hardware constituting a computer, in which a bottom portion thereof is opened and a space portion shielded by left and right lateral plates, a front plate, a rear plate and a top plate is established therein; and a chassis front inserted and mounted into the outside of the front plate of the case main body, the computer case comprising:

a receiving portion, on which an optical disk drive is inserted and placed, established in the form of a container, of which an inner side is opened and outer, left and right sides are closed, below the chassis front constituting the computer case;

a tray moving groove, of which an outer side is opened, formed in the middle of the chassis front corresponding to an upper portion of the receiving portion to be connected with the receiving portion via a through-hole, through which a disk tray can be freely drawn in and out when driving the optical disk drive; and a fixing piece fixing the optical disk drive, established on both sides of the front plate of the case main body corresponding to the position where the receiving portion is formed.

2. The computer case with an optical disk drive mounted on a chassis front as recited in claim 1, wherein a disk drive operation switch electrically coupled to the optical disk drive and controlling the operation of the optical disk drive is established on one side of the chassis front;

wherein a main switch electrically connected to a main PCB mounted inside the case main body and controlling the ON/OFF operation of the computer is provided in front of the chassis front corresponding to an upper portion of the tray moving groove;

wherein a function portion section including a plurality of function ports electrically coupled to the main PCB mounted inside case main body is established on a top surface of the chassis front, and wherein the function port section is opened and closed by a cover.

3. The computer case with an optical disk drive mounted on a chassis front as recited in claim 1, wherein the optical disk drive is established vertically to the fixing pieces or a top end portion thereof is inclined in a slope of 3° to 5° based on the vertical line to the computer body.

4. The computer case with an optical disk drive mounted on a chassis front as recited in claim 1, wherein a disk separation preventing piece is adhered to both sides of a bottom surface of the disk tray so that a disk placed on the disk tray may not be separated forward.

5. The computer case with an optical disk drive mounted on a chassis front as recited in claim 1, wherein the receiving portion in the form of a container on which the optical disk drive is inserted and placed is established on the top of the chassis front; and wherein the tray moving groove through which the disk tray is freely drawn in and out when driving the optical disk drive is formed in front of the bottom of the chassis front corresponding to the bottom of the receiving portion.

* * * * *